(12) United States Patent
Chang et al.

(10) Patent No.: US 8,905,175 B2
(45) Date of Patent: Dec. 9, 2014

(54) REMOTE-CONTROLLED ELECTRIC GOLF BAG CART

(71) Applicant: Tung Thih Electronic Co., Ltd., Taoyuan County (TW)

(72) Inventors: Chen-Hui Chang, Taoyuan County (TW); Yu-Hsin Liu, Taoyuan County (TW); Shun-Lin Kuo, Taoyuan County (TW); Shih-Tsung Chiang, Taoyuan County (TW)

(73) Assignee: Tung Thih Electronic Co., Ltd., Taoyuan County (TW)

( * ) Notice: Subject to any disclaimer, the term of this patent is extended or adjusted under 35 U.S.C. 154(b) by 0 days.

(21) Appl. No.: 13/740,498

(22) Filed: Jan. 14, 2013

(65) Prior Publication Data

US 2014/0196967 A1    Jul. 17, 2014

(51) Int. Cl.
 *B62D 1/24* (2006.01)
 *A63B 55/08* (2006.01)
(52) U.S. Cl.
 CPC .............. *A63B 55/087* (2013.01); *Y10S 280/05* (2013.01)
 USPC ...................................... 180/167; 280/DIG. 5
(58) Field of Classification Search
 CPC .............................. B60K 31/0058; B62D 1/28
 USPC ....................................... 180/167; 280/DIG. 5
 See application file for complete search history.

(56) References Cited

U.S. PATENT DOCUMENTS

| | | | | |
|---|---|---|---|---|
| 3,472,333 A | * | 10/1969 | Loewenstern, Jr. ............ | 180/167 |
| 3,473,623 A | * | 10/1969 | Meek, Jr. et al. ............. | 180/167 |
| 3,720,281 A | * | 3/1973 | Frownfelter .................. | 180/167 |
| 3,742,507 A | * | 6/1973 | Pirre .............................. | 180/167 |
| 3,748,564 A | * | 7/1973 | Ohba ............................ | 318/587 |
| 3,812,929 A | * | 5/1974 | Farque .......................... | 180/167 |
| 3,856,104 A | * | 12/1974 | Ohba ............................ | 180/167 |
| 3,976,151 A | * | 8/1976 | Farque .......................... | 180/169 |
| 4,023,178 A | * | 5/1977 | Suyama ........................ | 180/169 |
| 4,109,186 A | * | 8/1978 | Farque .......................... | 318/587 |
| 4,656,476 A | * | 4/1987 | Tavtigian ...................... | 340/993 |
| 5,053,768 A | * | 10/1991 | Dix, Jr. ......................... | 340/988 |
| 5,086,535 A | * | 2/1992 | Grossmeyer et al. ........... | 15/319 |

(Continued)

FOREIGN PATENT DOCUMENTS

| | | |
|---|---|---|
| GB | 2 283 838 A | 5/1995 |
| WO | WO-9 912 793 A1 | 3/1999 |

OTHER PUBLICATIONS

Extended European Search Report for European Application No. 12 19 2460.9 mailed Apr. 24, 2013.

*Primary Examiner* — Jeffrey J Restifo
(74) *Attorney, Agent, or Firm* — Jacobson Holman Abe Herskovitz

(57) ABSTRACT

A remote-controlled electric golf bag cart has a remote control, a support frame, an antenna set and a control module. The remote control transmits a distance measurement signal. The support frame has a wheel assembly, a golf bag stand and a motor assembly mounted thereon. The antenna set and the control module are mounted on the support frame. The antenna set receives the distance measurement signal. The control module determines an orientation and a distance of the remote control according to the distance measurement signal received by the antenna set, and drives the motor assembly to move the support frame forward toward the remote control, making the support follow a user having the remote control and preventing other in-field persons and obstacles from affecting the support frame to follow the remote control.

19 Claims, 7 Drawing Sheets

(56) References Cited

U.S. PATENT DOCUMENTS

| | | | |
|---|---|---|---|
| 5,137,103 A * | 8/1992 | Cartmell | 180/167 |
| 5,167,389 A * | 12/1992 | Reimers | 248/96 |
| 5,180,023 A * | 1/1993 | Reimers | 180/19.1 |
| 5,517,098 A * | 5/1996 | Dong | 318/581 |
| 5,611,406 A * | 3/1997 | Matsuzaki et al. | 180/167 |
| 5,711,388 A * | 1/1998 | Davies et al. | 180/168 |
| 5,749,424 A * | 5/1998 | Reimers | 180/19.2 |
| 5,899,284 A * | 5/1999 | Reimers et al. | 180/11 |
| 5,944,132 A * | 8/1999 | Davies et al. | 180/168 |
| 7,353,089 B1 * | 4/2008 | McEvoy | 701/2 |
| 2010/0168934 A1 * | 7/2010 | Ball et al. | 701/2 |
| 2013/0098700 A1 * | 4/2013 | Zhang et al. | 180/167 |

* cited by examiner

REMOTE-CONTROLLED ELECTRIC GOLF BAG CART

BACKGROUND OF THE INVENTION

1. Field of the Invention

The present invention relates to a golf bag cart and more particularly to a remote-controlled electric golf bag cart.

2. Description of the Related Art

Golf bag carts primarily serve to carry golf equipment so that golf players do not need to carry heavy golf equipment when walking in the golf fields and golf skill practice will not be affected for sake of the additional physical strength consumption.

Nowadays, lots of electric golf bag carts have been available in the market. Disclosed by Taiwanese utility model patent publication no. 304440, a hand-controlled electric golf bag cart has a motor for driving a wheel assembly, and a control button mounted on a handle of the cart to control the motor. After pressing the control button to control the motor so as to drive the wheel assembly, users do not need to manually keep the golf bag cart moving by themselves. Due to rapid technological progress recent years, an automatic searching and tracking electric golf bag cart came on the market and has an ultrasonic radar and a master controller mounted thereon. The master controller is connected to the ultrasonic radar for the ultrasonic radar to transmit an ultrasonic signal toward a forward direction of the electric golf bag cart. Because of the concept that ultrasonic waves reflect from an object, the master controller can determine a distance and an orientation between the electric golf bag cart and an object in front of the cart according to an ultrasonic signal and its reflected signal, and drives a motor to rotate according to the measured distance so that the electric golf bag cart follows the object ahead and keeps a preset distance from the object (for example 4 to 6 meters). Hence, when a golf player is walking ahead of the electric golf bag cart, the electric golf bag cart then automatically follows the golf player, and such electric golf bag cart is relatively convenient than those conventional electric golf bag carts.

However, as the foregoing electric golf bag cart measures the distance between itself and an object ahead with ultrasonic waves, to some extent, its operation may be affected by objects other than the golf player. If other persons or balls pass between the electric golf bag cart and the person ahead of the cart, such event will result in malfunctions of the electric golf bag cart, for example, the electric golf bag cart stops following or follows a wrong person, and thus make such electric golf bag cart unsatisfactory in operation.

SUMMARY OF THE INVENTION

An objective of the present invention is to provide a remote controlled electric golf bag cart being immune from the interference caused by surrounding persons and obstacle.

To achieve the foregoing objective, the remote-controlled electric golf bag cart has a remote control, a support frame, an antenna set and a control module.

The remote control transmits a distance measurement signal.

The support frame has a wheel assembly, a golf bag stand and a motor assembly. The motor assembly is connected with the wheel assembly to drive the wheel assembly.

The antenna set is mounted on the support frame, has multiple antenna units facing to at least a front side, a left side, a right side of the support frame, and receives the distance measurement signal transmitted from the remote control with the antenna units.

The control module is mounted on the support frame, is electrically connected to the antenna set and the motor assembly, and sets a minimum distance, determines an orientation of the remote control with respect to the antenna set after acquiring the distance measurement signal received from the antenna set, calculates a distance between the remote control and the antenna set, and comparing the distance with the minimum distance, and if the distance is greater than the minimum distance, controls the motor assembly to drive the wheel assembly for the support frame to approach the remote control.

As the remote control is carried by a user, the control module of the remote controlled electric golf bag cart determines an orientation of the remote control with respect to the antenna set and a distance therebetween according to the distance measurement signal without being interfered by other persons or obstacles. Accordingly, the control module controls the motor assembly to drive the wheel assembly so that the support frame will not follow a wrong person or miscalculate the distance during a following course.

Other objectives, advantages and novel features of the invention will become more apparent from the following detailed description when taken in conjunction with the accompanying drawings.

DETAILED DESCRIPTION OF THE INVENTION

Figure 1:
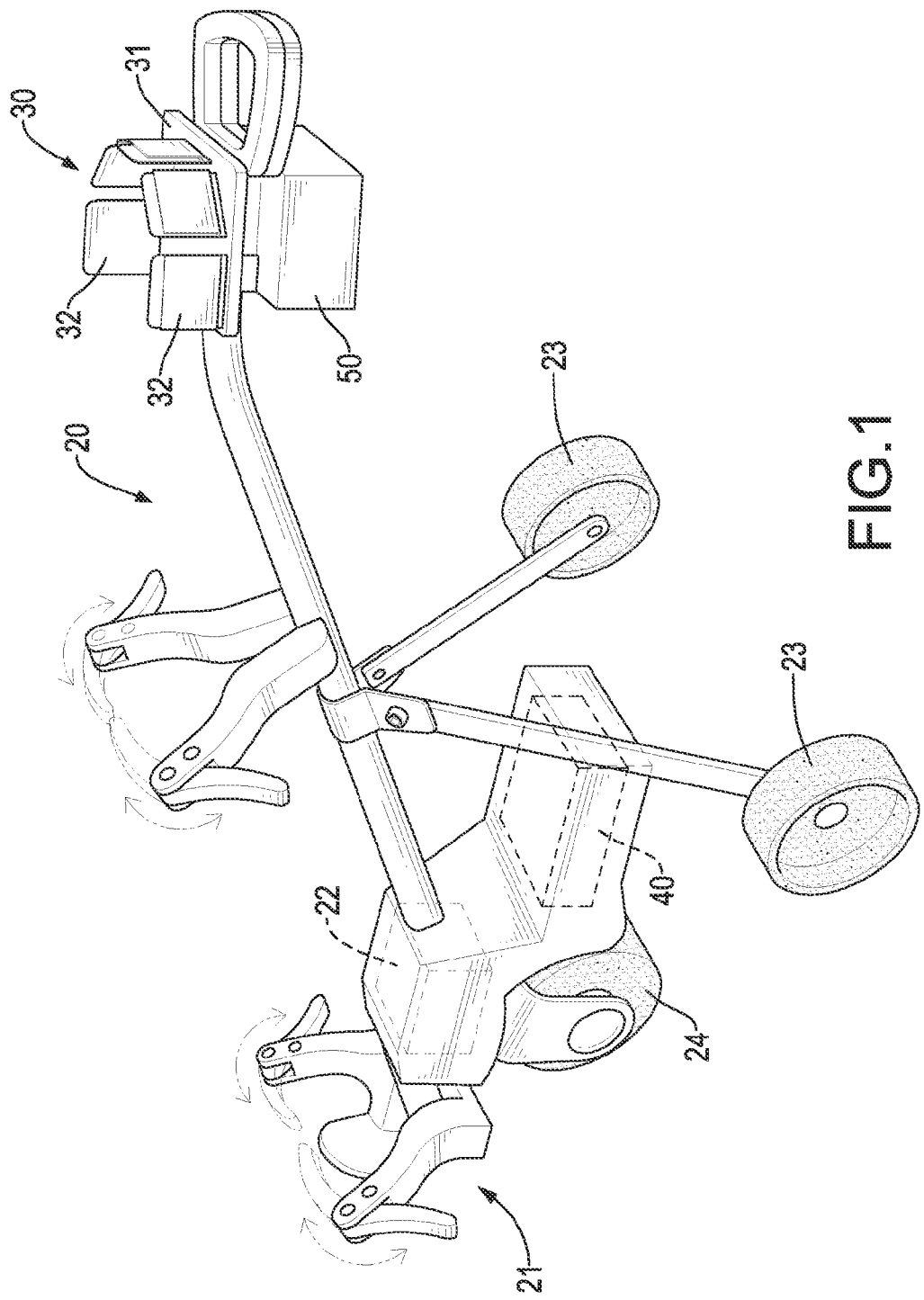
FIG. 1 is a partial perspective view of a remote-controlled electric golf bag cart in accordance with the present invention.
Figure 2:
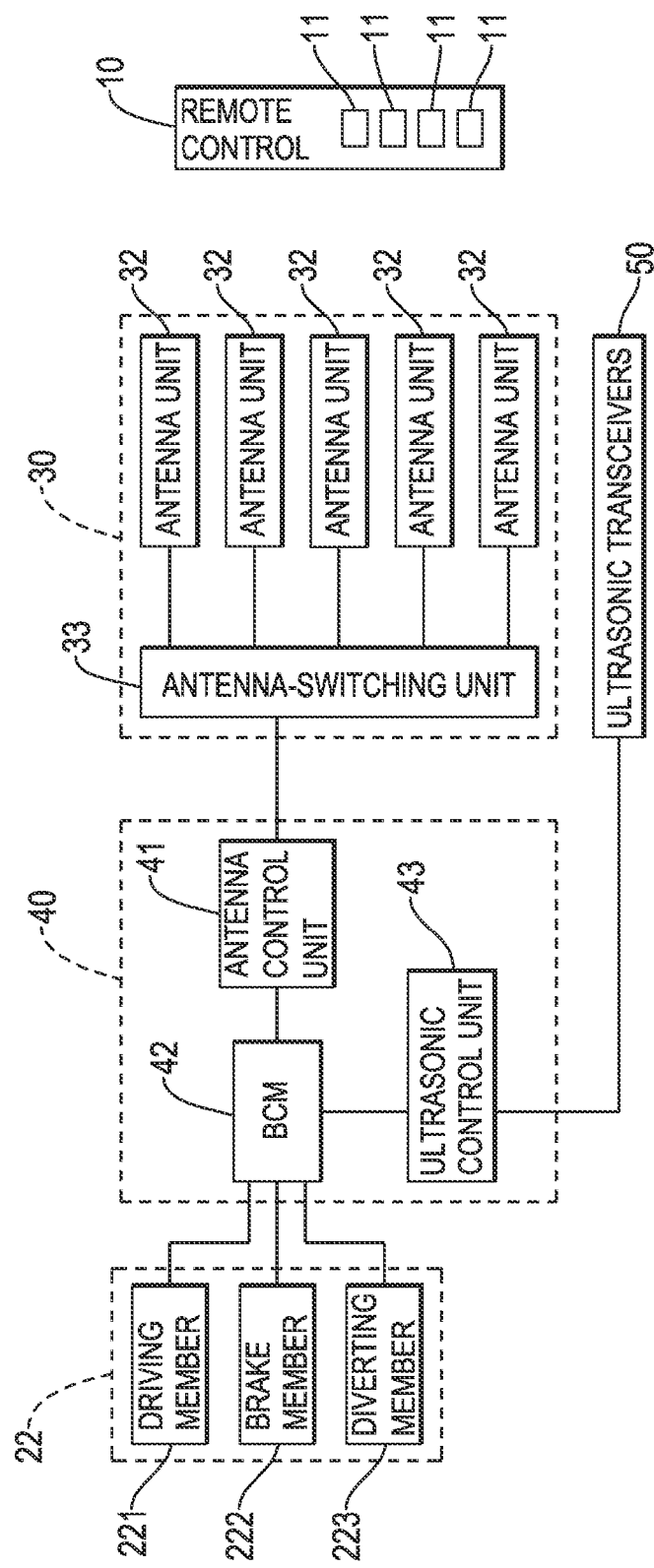
FIG. 2 is a functional block diagram of the remote-controlled electric golf bag cart in FIG. 1.

With reference to FIGS. 1 and 2, a remote-controlled electric golf bag cart in accordance with the present invention has a remote control 10, a support frame 20, an antenna set 30 and a control module 40.

The remote control 10 serves to transmit a distance measurement signal. In the present embodiment, the remote control 10 is built in with an acceleration command, a deceleration command, a left turn command and a right turn command. The remote control 10 has multiple buttons 11 to correspond to the acceleration command, the deceleration command, the left turn command and the right turn command for users to issue a corresponding command after operating the remote control 10.

The support frame 20 has a wheel assembly, a golf bag stand 21 and a motor assembly 22. The motor assembly 22 is connected with the wheel assembly to drive the wheel assembly. In the present embodiment, the wheel assembly has a set of front wheels 23 and a rear wheel. The motor assembly 22 is connected with the rear wheel 24 and has a driving member 221, a brake member 222 and a diverting member 223. The driving member 221 drives the rear wheel 24 to rotate. The brake member 222 stops the rear wheel 24 from rotating. The diverting member 223 changes a moving direction of the rear wheel 24.

The antenna set 30 is mounted on the support frame 20 and receives a distance measurement signal transmitted from the remote control 10 and has multiple antenna units 32 facing to at least the front side, the left side, the right side of the support frame 20. The antenna units 32 serve to receive the distance measurement signals transmitted from the remote control 10 and their detailed structure is described later. In the present embodiment, each antenna unit 32 is a panel antenna, and the antenna set 30 further receives the acceleration command, the deceleration command, the left turn command and the right turn command transmitted from the remote control 10.

The control module is mounted on the support frame 20, is electrically connected to the antenna set 30 and the motor assembly 22, and sets a minimum distance. After acquiring the distance measurement signal received from the antenna set 30, the control module 40 determines an orientation of the remote control 10 with respect to the antenna set 30, calculates a distance between the remote control 10 and the antenna set 30, and compare the distance with the minimum distance. If the distance is greater than the minimum distance, the control module 40 controls the motor assembly 22 to drive the wheel assembly so that the support frame 20 approaches the remote control 10 to maintain the distance between the antenna set 30 and the remote control 10 to be not less than the minimum distance.

Figure 3:
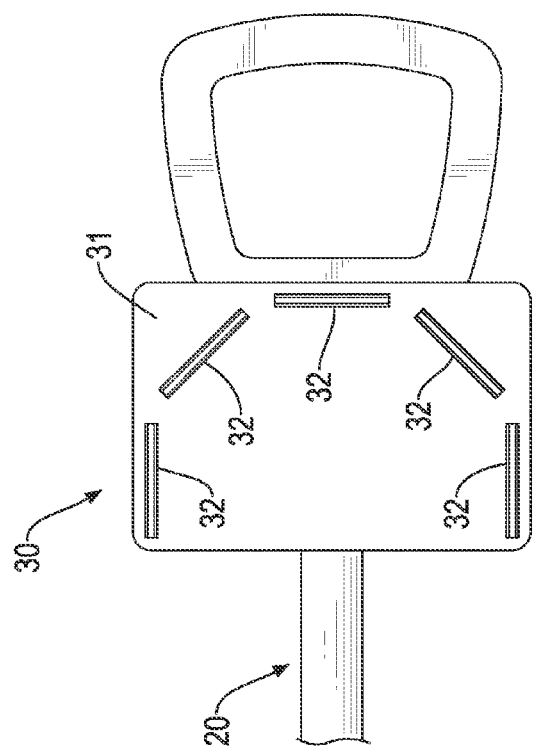
FIG. 3 is a partially enlarged top view of the remote-controlled electric golf bag cart in FIG. 1.

The detailed structure of the antenna set 30 is further described as follows. The antenna set 30 has a mounting base 31, multiple antenna units 32 and an antenna-switching unit 33. The mounting base 31 is securely mounted on a top of a front end of the support frame 20. The antenna units 32 are securely and erectly mounted on the mounting base 31, and respectively face to the front side, the left side, the right side, the left front side and the right front side of the support frame 20 as shown in FIG. 3. The antenna-switching unit 33 is electrically connected to the antenna units 32.

The control module 40 has an antenna control unit 41 and a body control module (BCM) 42.

The antenna control unit 41 is electrically connected to the antenna-switching unit 33 to acquire the distance measurement signals received from the respective antenna units 32. After detecting a field strength of the received distance measurement signal from each antenna unit 32, the antenna control unit 41 determines an orientation of the remote control 10 with respect to the antenna set 30 according to the field strength of the received distance measurement signal of each antenna unit 32, calculates the distance between the remote control 10 and the antenna set 30, and outputs a corresponding orientation datum and a corresponding distance datum.

The BCM 42 is electrically connected to the antenna control unit 41 and the driving member 221, the brake member 222 and the diverting member 223 of the motor assembly 22, and is built in with the minimum distance. After receiving the orientation datum and the distance datum outputted from the antenna control unit 41, the BCM 42 determines if a distance corresponding to the distance datum is greater than the minimum distance, if positive, drives the driving member 221 and the diverting member 223 of the motor assembly 22 for the support frame 20 to move forward toward an orientation of the remote control 10 corresponding to the orientation datum, keeps receiving the orientation datum and the distance datum, and if a distance corresponding to the received distance datum is not greater than the minimum distance, activates the brake member 222 of the motor assembly 22 to stop the support frame 20 from moving forward.

The antenna control unit 41 that determines the orientation and the distance between the remote control 10 and the antenna set 30 according to the field strength of the received distance measurement signal of each antenna unit 32 can detect a received signal strength indicator (RSSI) value of the received distance measurement signal of each antenna unit 32, and is built in with a back propagation network to acquire the orientation datum and the distance datum corresponding to the received RSSI values of each antenna unit 32 inputted to the back propagation network.

The BCM 42 is built in with multiple speed levels and drives the driving member 221 according to one of the speed levels. When receiving the acceleration command transmitted from the remote control 10, the BCM 42 increases the moving speed of the driving member 221 from the current speed level to a next higher speed level. Preferably, the speeds per hour corresponding to the speed levels may be set to 1.5 km/hour, 3 km/hour, 4.5 km/hour and the like. Similarly, when receiving the deceleration command transmitted from the remote control 10, the BCM 42 decreases the moving speed of the driving member 221 from the current speed level to a next lower speed level. When receiving the left turn command or the right turn command transmitted from the remote control 10, the BCM 42 drives the diverting member 223 for the support frame 20 to make a left turn or a right turn.

Figure 4:
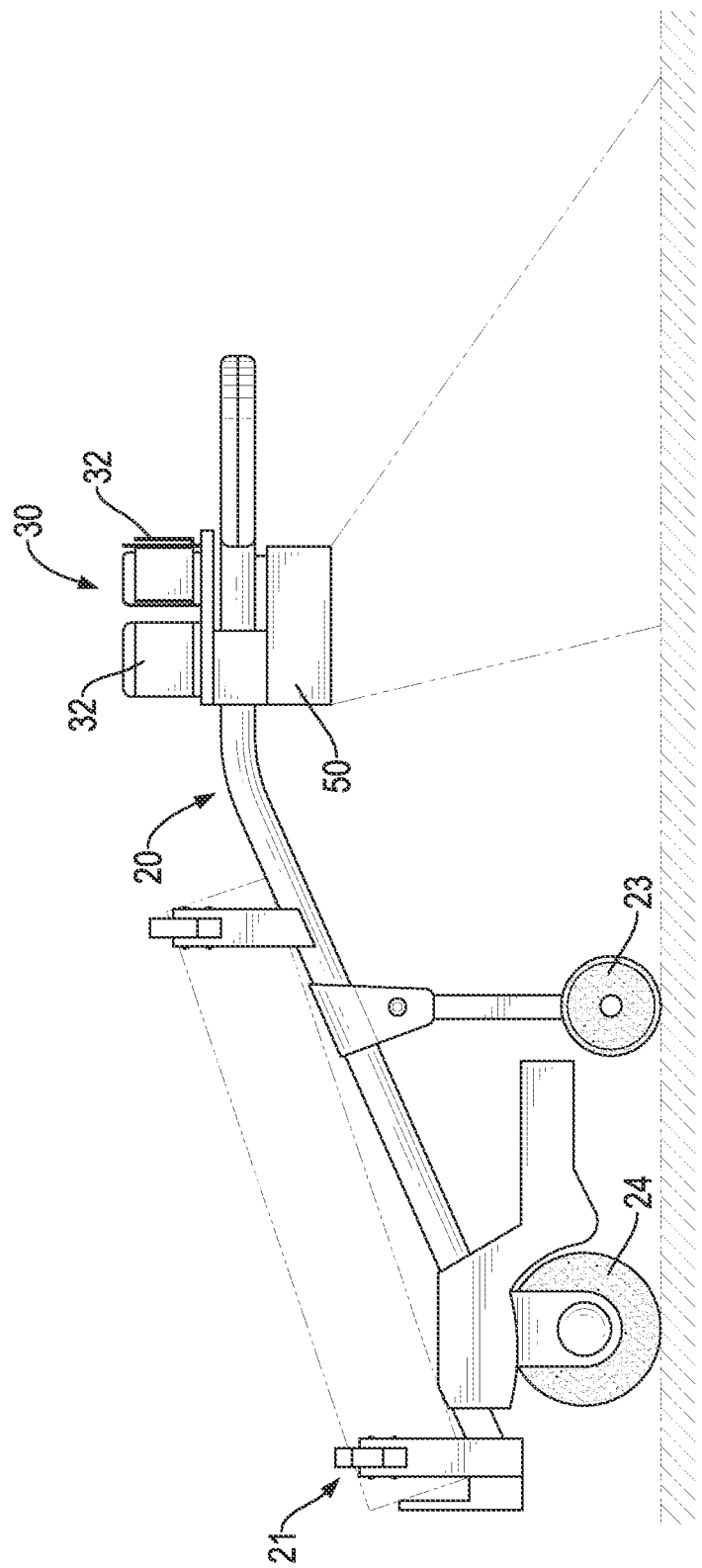
FIG. 4 is a first operation side view of the remote-controlled electric golf bag cart in FIG. 1 when detecting a distance to the ground.
Figure 5:
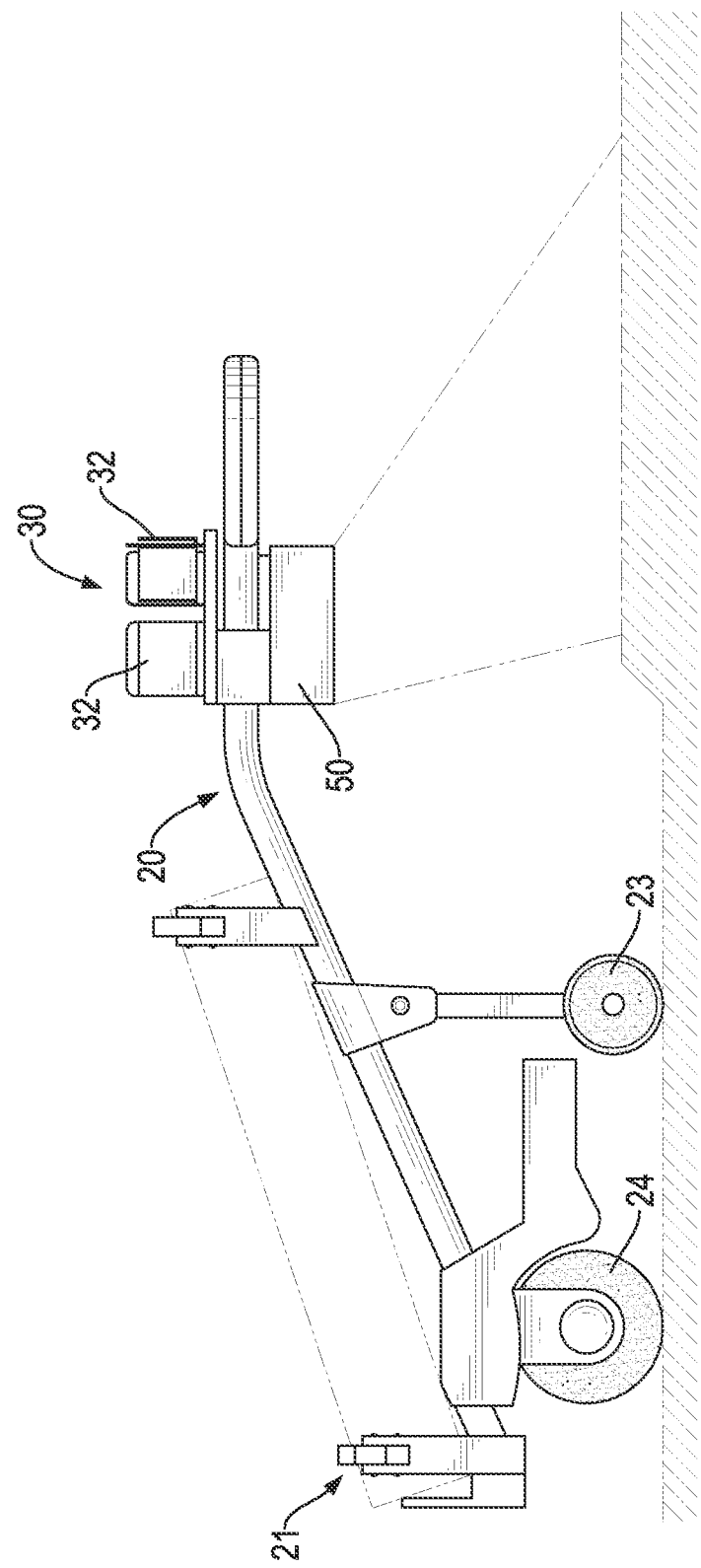
FIG. 5 is a second operation side view of the remote-controlled electric golf bag cart in FIG. 1 when detecting a distance to the ground.
Figure 6:
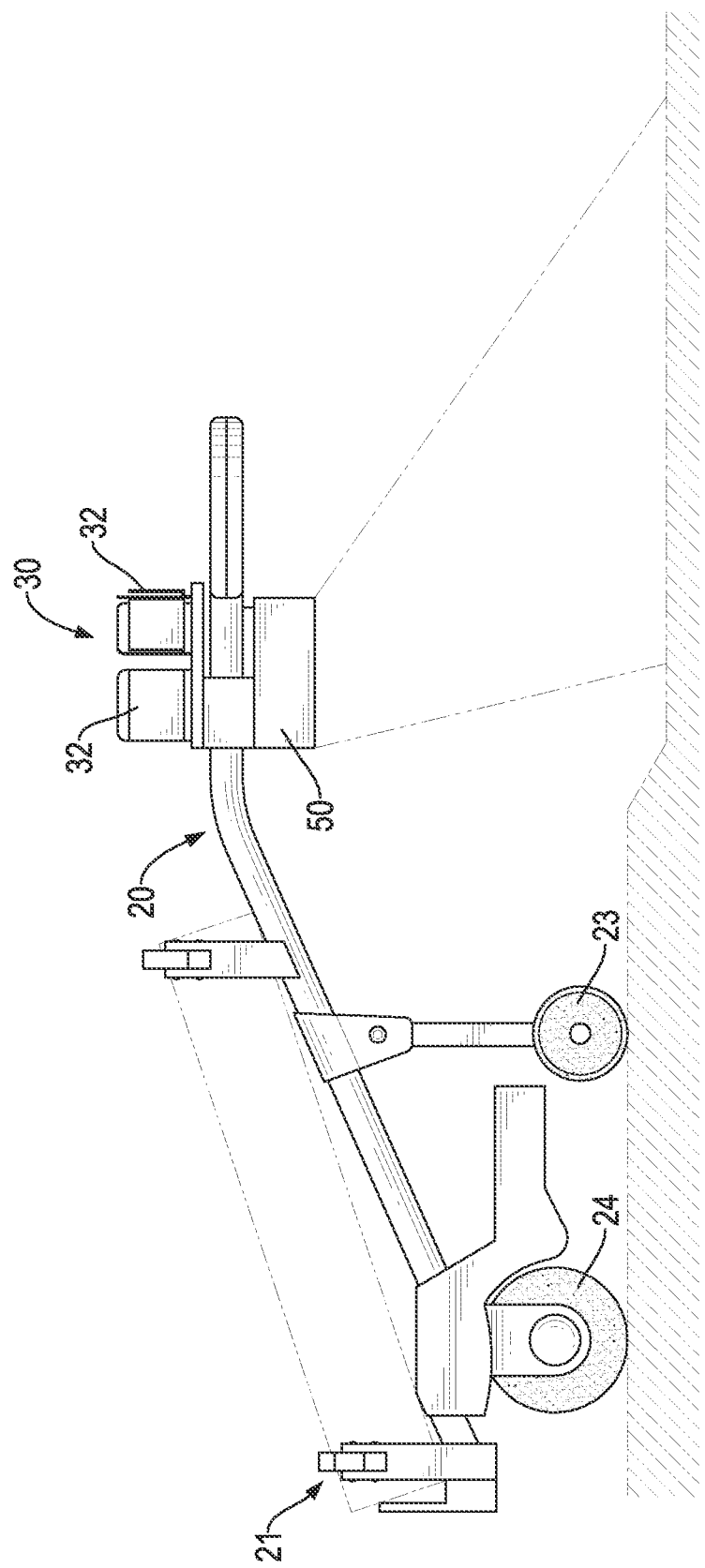
FIG. 6 is a third operation side view of the remote-controlled electric golf bag cart in FIG. 1 when detecting a distance to the ground.

As the ground condition of a golf field may be rough, to let the remote-controlled electric golf bag cart automatically stay away from a bumpy area on the road, the remote-controlled electric golf bag cart further has a set of ultrasonic transceivers 50 mounted on a bottom of the front end of the support frame 20, transmitting ultrasonic waves to the ground and receiving reflected waves. The control module 40 further has an ultrasonic control unit 43. The BCM 42 is further built in with a maximum distance to the ground and a minimum distance to the ground. The ultrasonic control unit 43 is electrically connected to the set of ultrasonic transceivers 50 and the BCM 42, calculates a distance of the set of ultrasonic transceivers 50 above the ground after the set of ultrasonic transceivers 50 transmits an ultrasonic wave and receives a reflected wave, and outputs the distance above the ground to the BCM 42. When the motor assembly 22 drives the support frame 20 to move forward, the BCM 42 continuously receives the distance above the ground and compares it with the maximum distance to the ground and the minimum distance to the ground. With reference to FIGS. 4 to 6, when the distance above the ground falls between the maximum distance to the ground and the minimum distance to the ground, the BCM 42 controls the motor assembly 22 to continuously drive the support frame 20 to move forward and follow the remote control 10. When the distance above the ground is less than the minimum distance to the ground, it indicates a bump in the road. When the distance above the ground is more than the maximum distance to the ground, it indicates a pit in the road. Hence, when determining the distance above the ground is more than the maximum distance to the ground or less than the minimum distance to the ground, the BCM 42 stops the support frame 20 from moving and selectively drives the diverting member 223 to make a turn so as to stay away from the bump or the pit.

Besides, the distance measurement signal transmitted from the remote control 10 is a radio signal in the 2.4 GHz ISM band.

Figure 7:
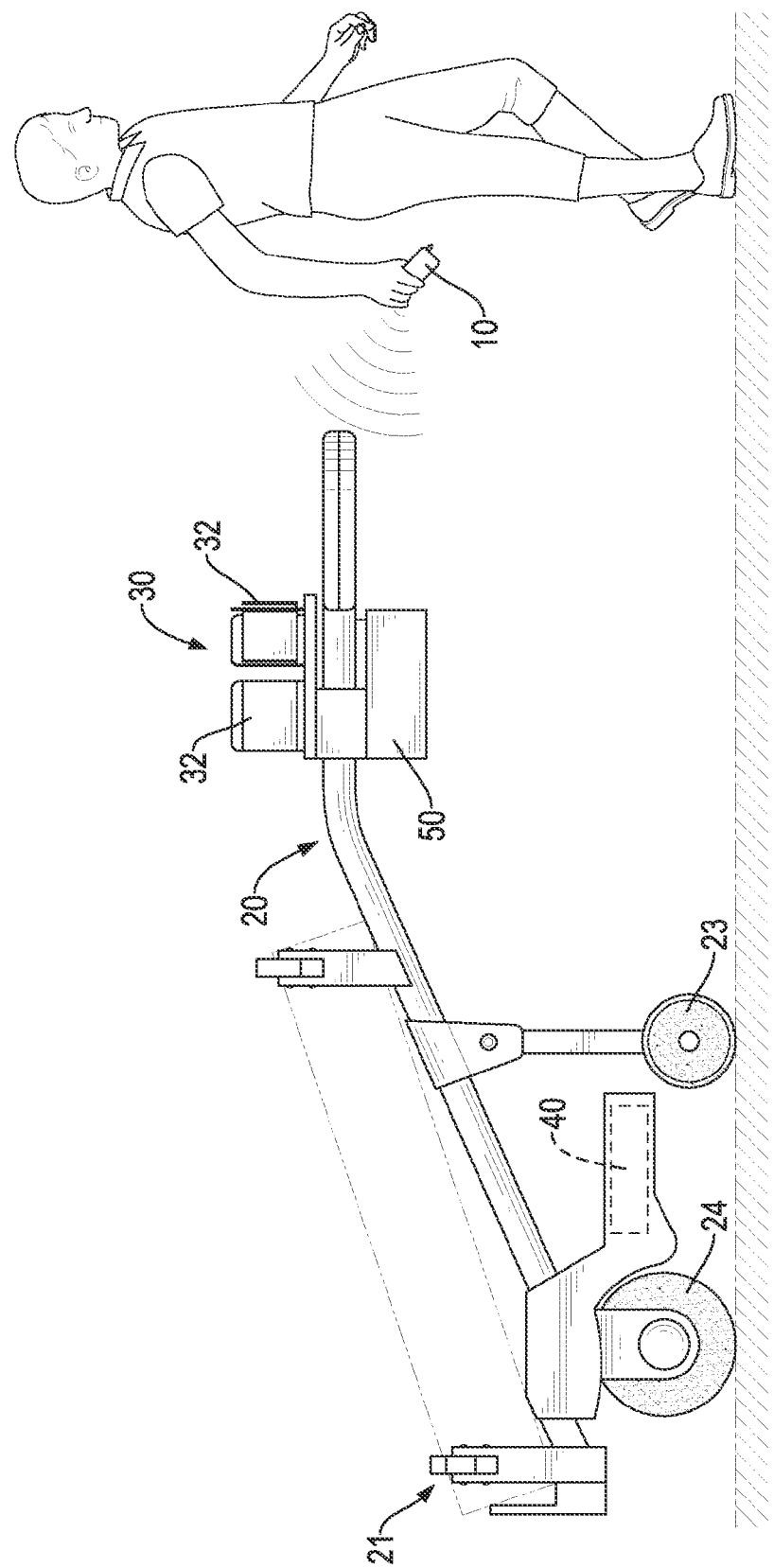
FIG. 7 is an operation side view of the remote-controlled electric golf bag cart in FIG. 1 when following a person with a remote control.

With reference to FIG. 7, when the remote-controlled golf bag cart is operated, the remote control 10 can be carried on a user's body. The control module 40 mounted in the support frame 20 determines an orientation of the remote control 10 with respect to the remote control 10 according to the distance measurement signal transmitted from the remote control 10 and calculates a distance therebetween so that the orientation and distance of the user relative to the support frame 20 can be obtained. Such acquisition of the distance and orientation of the remote control is not affected by other persons between the remote control 10 and the support frame 20. The antenna control unit 41 in the control module 40 can accurately acquire the orientation and distance of a target, that is, a user carrying the remote control 10, to be followed. After receiving the orientation datum and the distance datum, the BCM 42 then drives the support frame 20 to move forward toward the remote control 10 to achieve the purpose that the remote-controlled electric golf bag cart accurately follows a user. Based on the mechanism using ultrasonic waves to detect a distance to the ground, the remote-controlled electric golf bag cart can automatically stay away from a bumpy road condition to prevent itself from being stuck in a pit, blocked by stairs or damaged by road condition during the following course.

In sum, the remote-controlled electric golf bag cart can get rid of the influence of other persons or obstacles in the field, which may result in incorrect determination of the orientation and distance to the target to be followed, to accurately follow the user carrying the remote control, thereby providing a smoother operation.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A remote-controlled electric golf bag cart comprising:
    a remote control transmitting a distance measurement signal;
    a support frame having a wheel assembly, a golf bag stand and a motor assembly, wherein the motor assembly is connected with the wheel assembly to drive the wheel assembly;
    an antenna set mounted on the support frame, having:
        a mounting base securely mounted on a top of a front end of the support frame;
        multiple antenna units securely and erectly mounted on the mounting base, and respectively facing to a front side, a left side, a right side, a left front side and a right front side of the support frame, and receiving the distance measurement signal transmitted from the remote control with the antenna units; and
        an antenna-switching unit electrically connected to the antenna units; and
    a control module mounted on the support frame, electrically connected to the antenna set and the motor assembly, and setting a minimum distance, determining an orientation of the remote control with respect to the antenna set after acquiring the distance measurement signal received from the antenna set, calculating a distance between the remote control and the antenna set, and comparing the distance with the minimum distance, and if the distance is greater than the minimum distance, controlling the motor assembly to drive the wheel assembly for the support frame to approach the remote control.

2. The remote-controlled electric golf bag cart as claimed in claim 1, wherein
    the wheel assembly has a set of front wheels and a rear wheel; and
    the motor assembly is connected with the rear wheel and has:
        a driving member driving the rear wheel to rotate;
        a brake member stopping the rear wheel from rotating; and
        a diverting member changing a moving direction of the rear wheel.

3. The remote-controlled electric golf bag cart as claimed in claim 2, wherein
    the remote control is built in with an acceleration command and a deceleration command and has multiple buttons to correspond to the acceleration command and the deceleration command so that the remote control is operated to transmit the acceleration command or the deceleration command and the antenna set receives the acceleration command or the deceleration command transmitted from the remote control; and
    the BCM is built in with multiple speed levels and drives the driving member according to one of the speed levels, increases a moving speed of the driving member from a current speed level to a next higher speed level when receiving the acceleration command transmitted from the remote control, and decreases the moving speed of the driving member from the current speed level to a next lower speed level when receiving the deceleration command transmitted from the remote control.

4. The remote-controlled electric golf bag cart as claimed in claim 3, wherein
    the remote control is built in with a left turn command and a right turn command and has multiple buttons to correspond to the left turn command and the right turn command so that the remote control is operated to transmit the left turn command or the right turn command and the antenna set receives the left turn command or the right turn command transmitted from the remote control; and
    the BCM drives the diverting member to turn the support frame to the left or to the right when receiving the left turn command or the right turn command transmitted from the remote control.

5. The remote-controlled electric golf bag cart as claimed in claim 4, wherein the distance measurement signal transmitted from the remote control is a radio signal in the 2.4 GHz ISM band.

6. The remote-controlled electric golf bag cart as claimed in claim 3, wherein the distance measurement signal transmitted from the remote control is a radio signal in the 2.4 GHz ISM band.

7. The remote-controlled electric golf bag cart as claimed in claim 2, wherein
    the remote control is built in with a left turn command and a right turn command and has multiple buttons to correspond to the left turn command and the right turn command so that the remote control is operated to transmit the left turn command or the right turn command and the antenna set receives the left turn command or the right turn command transmitted from the remote control; and the BCM drives the diverting member to turn the support frame to the left or to the right when receiving the left turn command or the right turn command transmitted from the remote control.

8. The remote-controlled electric golf bag cart as claimed in claim 1, wherein the control module has:
   an antenna control unit electrically connected to the antenna-switching unit to acquire the distance measurement signals received from the respective antenna units, determining an orientation of the remote control with respect to the antenna set according to a field strength of the received distance measurement signal of each antenna unit after detecting the field strength of the received distance measurement signal from each antenna unit, calculating the distance between the remote control and the antenna set, and outputting a corresponding orientation datum and a corresponding distance datum; and
   a body control module (BCM) electrically connected to the antenna control unit and the driving member, the brake member and the diverting member of the motor assembly, and built in with the minimum distance, determining if a distance corresponding to the distance datum is greater than the minimum distance after receiving the orientation datum and the distance datum outputted from the antenna control unit, if positive, driving the driving member and the diverting member of the motor assembly for the support frame to move forward toward an orientation of the remote control corresponding to the orientation datum, keeping receiving the orientation datum and the distance datum, and if a distance corresponding to the received distance datum is not greater than the minimum distance, activating the brake member of the motor assembly to stop the support frame from moving forward.

9. The remote-controlled electric golf bag cart as claimed in claim 8, further comprising a set of ultrasonic transceivers mounted on a bottom of the front end of the support frame, transmitting ultrasonic waves to the ground and receiving reflected waves, wherein
   the control module further has an ultrasonic control unit electrically connected to the set of ultrasonic transceivers and the BCM, calculating a distance of the ultrasonic transceivers above the ground after the set of ultrasonic transceivers transmits an ultrasonic wave and receives a reflected wave, and outputting the distance above the ground to the BCM; and
   the BCM is further built in with a maximum distance to the ground and a minimum distance to the ground, continuously receives the distance above the ground and compares the distance above the ground with the maximum distance to the ground and the minimum distance to the ground when the motor assembly drives the support frame to move forward, controls the motor assembly to continuously drive the support frame to move forward when the distance above the ground falls between the maximum distance to the ground and the minimum distance to the ground, stops the support frame from moving and selectively drives the diverting member to make a turn when determining the distance above the ground is more than the maximum distance to the ground or less than the minimum distance to the ground.

10. The remote-controlled electric golf bag cart as claimed in claim 9, wherein
    the remote control is built in with an acceleration command and a deceleration command and has multiple buttons to correspond to the acceleration command and the deceleration command so that the remote control is operated to transmit the acceleration command or the deceleration command and the antenna set receives the acceleration command or the deceleration command transmitted from the remote control; and
    the BCM is built in with multiple speed levels and drives the driving member according to one of the speed levels, increases a moving speed of the driving member from a current speed level to a next higher speed level when receiving the acceleration command transmitted from the remote control, and decreases the moving speed of the driving member from the current speed level to a next lower speed level when receiving the deceleration command transmitted from the remote control.

11. The remote-controlled electric golf bag cart as claimed in claim 10, wherein
    the remote control is built in with a left turn command and a right turn command and has multiple buttons to correspond to the left turn command and the right turn command so that the remote control is operated to transmit the left turn command or the right turn command and the antenna set receives the left turn command or the right turn command transmitted from the remote control; and
    the BCM drives the diverting member to turn the support frame to the left or to the right when receiving the left turn command or the right turn command transmitted from the remote control.

12. The remote-controlled electric golf bag cart as claimed in claim 11, wherein the distance measurement signal transmitted from the remote control is a radio signal in the 2.4 GHz ISM band.

13. The remote-controlled electric golf bag cart as claimed in claim 9, wherein
    the remote control is built in with a left turn command and a right turn command and has multiple buttons to correspond to the left turn command and the right turn command so that the remote control is operated to transmit the left turn command or the right turn command and the antenna set receives the left turn command or the right turn command transmitted from the remote control; and
    the BCM drives the diverting member to turn the support frame to the left or to the right when receiving the left turn command or the right turn command transmitted from the remote control.

14. The remote-controlled electric golf bag cart as claimed in claim 8, wherein
    the remote control is built in with a left turn command and a right turn command and has multiple buttons to correspond to the left turn command and the right turn command so that the remote control is operated to transmit the left turn command or the right turn command and the antenna set receives the left turn command or the right turn command transmitted from the remote control; and
    the BCM drives the diverting member to turn the support frame to the left or to the right when receiving the left turn command or the right turn command transmitted from the remote control.

15. The remote-controlled electric golf bag cart as claimed in claim 8, wherein
    the remote control is built in with an acceleration command and a deceleration command and has multiple buttons to correspond to the acceleration command and the deceleration command so that the remote control is operated to transmit the acceleration command or the deceleration command and the antenna set receives the acceleration command or the deceleration command transmitted from the remote control; and the BCM is built in with multiple speed levels and drives the driving member according to one of the speed levels, increases a moving speed of the driving member from a current speed level to a next higher speed level when receiving the acceleration command transmitted from the remote control, and decreases the moving speed of the driving member from the current speed level to a next lower speed level when receiving the deceleration command transmitted from the remote control.

16. The remote-controlled electric golf bag cart as claimed in claim 15, wherein
the remote control is built in with a left turn command and a right turn command and has multiple buttons to correspond to the left turn command and the right turn command so that the remote control is operated to transmit the left turn command or the right turn command and the antenna set receives the left turn command or the right turn command transmitted from the remote control; and
the BCM drives the diverting member to turn the support frame to the left or to the right when receiving the left turn command or the right turn command transmitted from the remote control.

17. The remote-controlled electric golf bag cart as claimed in claim 1, wherein
the remote control is built in with an acceleration command and a deceleration command and has multiple buttons to correspond to the acceleration command and the deceleration command so that the remote control is operated to transmit the acceleration command or the deceleration command and the antenna set receives the acceleration command or the deceleration command transmitted from the remote control; and
the BCM is built in with multiple speed levels and drives the driving member according to one of the speed levels, increases a moving speed of the driving member from a current speed level to a next higher speed level when receiving the acceleration command transmitted from the remote control, and decreases the moving speed of the driving member from the current speed level to a next lower speed level when receiving the deceleration command transmitted from the remote control.

18. The remote-controlled electric golf bag cart as claimed in claim 17, wherein
the remote control is built in with a left turn command and a right turn command and has multiple buttons to correspond to the left turn command and the right turn command so that the remote control is operated to transmit the left turn command or the right turn command and the antenna set receives the left turn command or the right turn command transmitted from the remote control; and
the BCM drives the diverting member to turn the support frame to the left or to the right when receiving the left turn command or the right turn command transmitted from the remote control.

19. The remote-controlled electric golf bag cart as claimed in claim 1, wherein
the remote control is built in with a left turn command and a right turn command and has multiple buttons to correspond to the left turn command and the right turn command so that the remote control is operated to transmit the left turn command or the right turn command and the antenna set receives the left turn command or the right turn command transmitted from the remote control; and
the BCM drives the diverting member to turn the support frame to the left or to the right when receiving the left turn command or the right turn command transmitted from the remote control.

\* \* \* \* \*